Aug. 16, 1960 J. H. RIGGS 2,949,309

SELECTOR DEVICE FOR AUTOMATIC PHONOGRAPHS

Filed March 13, 1956 4 Sheets-Sheet 1

INVENTOR.
JOHN H. RIGGS.

BY
Lockwood, Galt, Woodard & Smith
ATTORNEYS.

Aug. 16, 1960 J. H. RIGGS 2,949,309

SELECTOR DEVICE FOR AUTOMATIC PHONOGRAPHS

Filed March 13, 1956 4 Sheets-Sheet 2

INVENTOR.
JOHN H. RIGGS.
BY
Lockwood, Galt, Woodard & Smith
ATTORNEYS.

Aug. 16, 1960 J. H. RIGGS 2,949,309

SELECTOR DEVICE FOR AUTOMATIC PHONOGRAPHS

Filed March 13, 1956 4 Sheets-Sheet 3

INVENTOR.
JOHN H. RIGGS.
BY
Lockwood, Galt, Woodard & Smith
ATTORNEYS.

SELECTOR DEVICE FOR AUTOMATIC PHONOGRAPHS

Filed March 13, 1956 4 Sheets-Sheet 4

INVENTOR.
JOHN H. RIGGS.
BY
Lockwood, Galt, Woodard + Smith
ATTORNEYS.

2,949,309

SELECTOR DEVICE FOR AUTOMATIC PHONOGRAPHS

John H. Riggs, Kenmore, N.Y., assignor to The Rudolph Wurlitzer Company, Chicago, Ill., a corporation Filed Mar. 13, 1956, Ser. No. 571,221

9 Claims. (Cl. 274—10)

This invention relates generally to automatic phonograph apparatus and more particularly to a selector device for automatic phonographs which is adapted to select one or more records from a large number of stored records.

Automatic phonographs, such as that illustrated in United States Letters Patent No. 2,631,856, granted March 17, 1953, for Automatic Phonograph, and in the application for Letters Patent Serial No. 388,242, filed October 26, 1953, for Automatic Phonograph, include a record selector consisting of an annular arrangement of selector pins each of which may be released by an individual electromagnet in response to operation of a button-operated switch forming a part of a coin-operated control mechanism. Each of the said pins functions to effect selection of a record from a large group of records for playing on one side or the other on a turntable. The selector disclosed in the aforementioned patent is adapted to cooperate with an automatic phonograph capable of handing twenty-four records, for example. This particular selector requires an electromagnet for each record and therefore one hundred records, for excapable of handling twenty-four records, for example. ample, would require one hundred electromagnets.

The principal object of this invention is to provide a record selector of the same general type as those disclosed in the said letters patent and said application but having facilities adapted to provide selection of records from a much larger group of records without any substantial increase in the number of electromagnets required to perform a selecting function.

Another object of this invention is to provide a record selector mechanism for an automatic phonograph of the same general type as that disclosed in the said patent or said application but which is capable of selecting records from a much larger group of records without any substantial increase of the number of parts required and without any substantial increase in the overall size of the mechanism.

In accordance with this invention there is provided a record selector for an automatic phonograph which comprises an annular series of selector pins corresponding in number to the number of musical selections or records in the phonograph magazine, a plurality of electromagnets adapted to release said pins into active selecting position, and means controllable by a push-button control means for mechanically associating each electromagnet with a plurality of said selector pins in succession, whereby each electromagnet may be effective to release one or more pins selected from a group of pins and whereby one electromagnet may control a selection of one or more records or musical selections out of a group of records.

The full nature of the invention will be understood from the accompanying drawings and the following description and claims:

Figure 1:
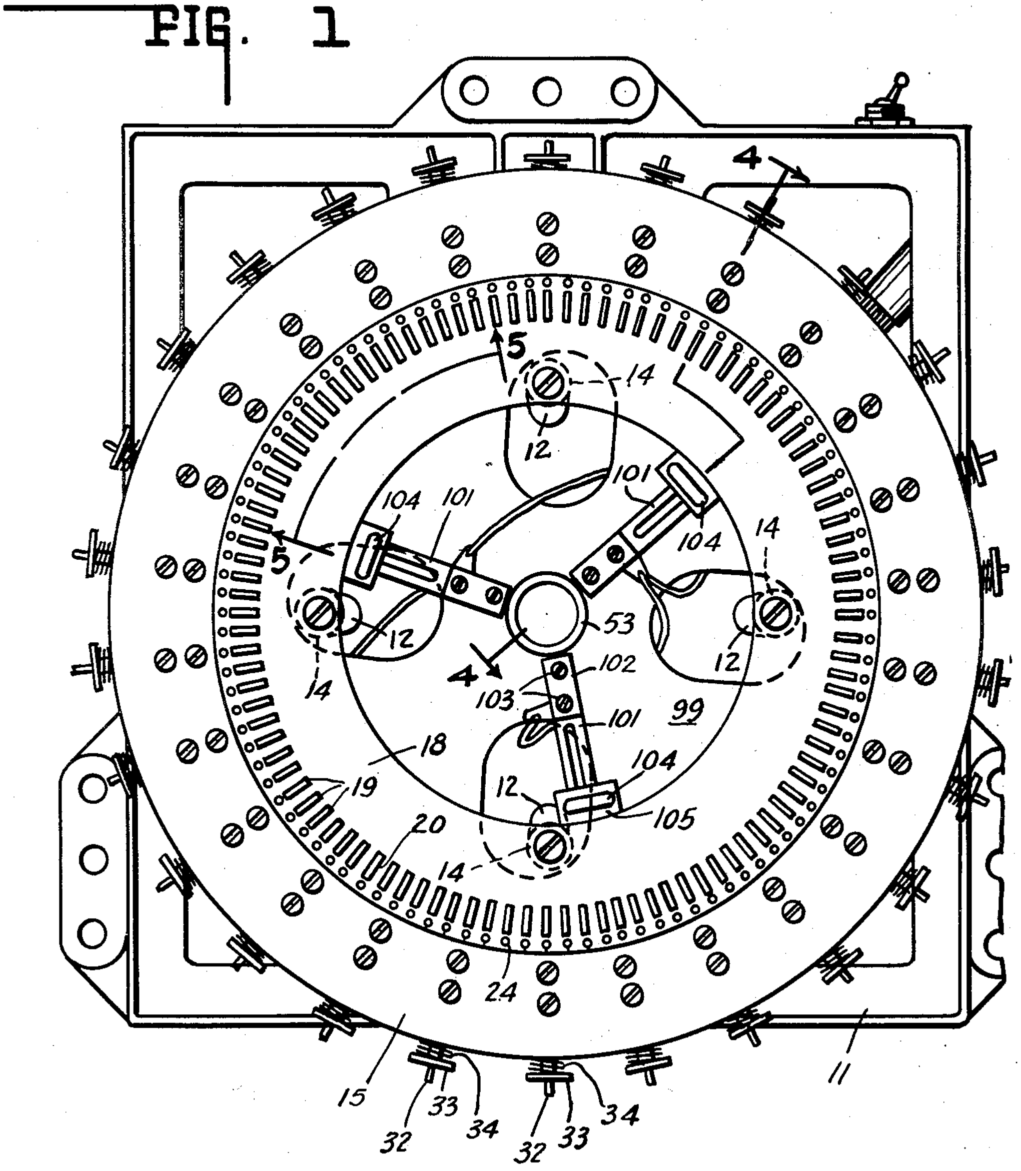
Fig. 1 is a top plan view of the record selector provided in accordance with this invention.

Referring to the drawings, the record selector mechanism provided in accordance with this invention comprises a rectangular chassis 10 on the upper side of which is mounted a base plate 11. The base plate 11 includes four radial arms 12, for example, each of which supports a vertical post 14. An annular plate 15 is supported intermediate the ends of posts 14 and an annular series of solenoids 16 are hung from the lower side of plate 15 by means of rectangular frame members 17. A second annular plate 18 may be supported on and secured to the upper ends of the posts 14 for supporting and guiding an annular series of record selector pins 19. Plate 18 is provided with slots 20 which receive and guide the upper ends of pins 19 while the plate 15 is also provided with similarly arranged slots 21 which support and guide the lower ends of the pins 19.

Figures 4, 5:
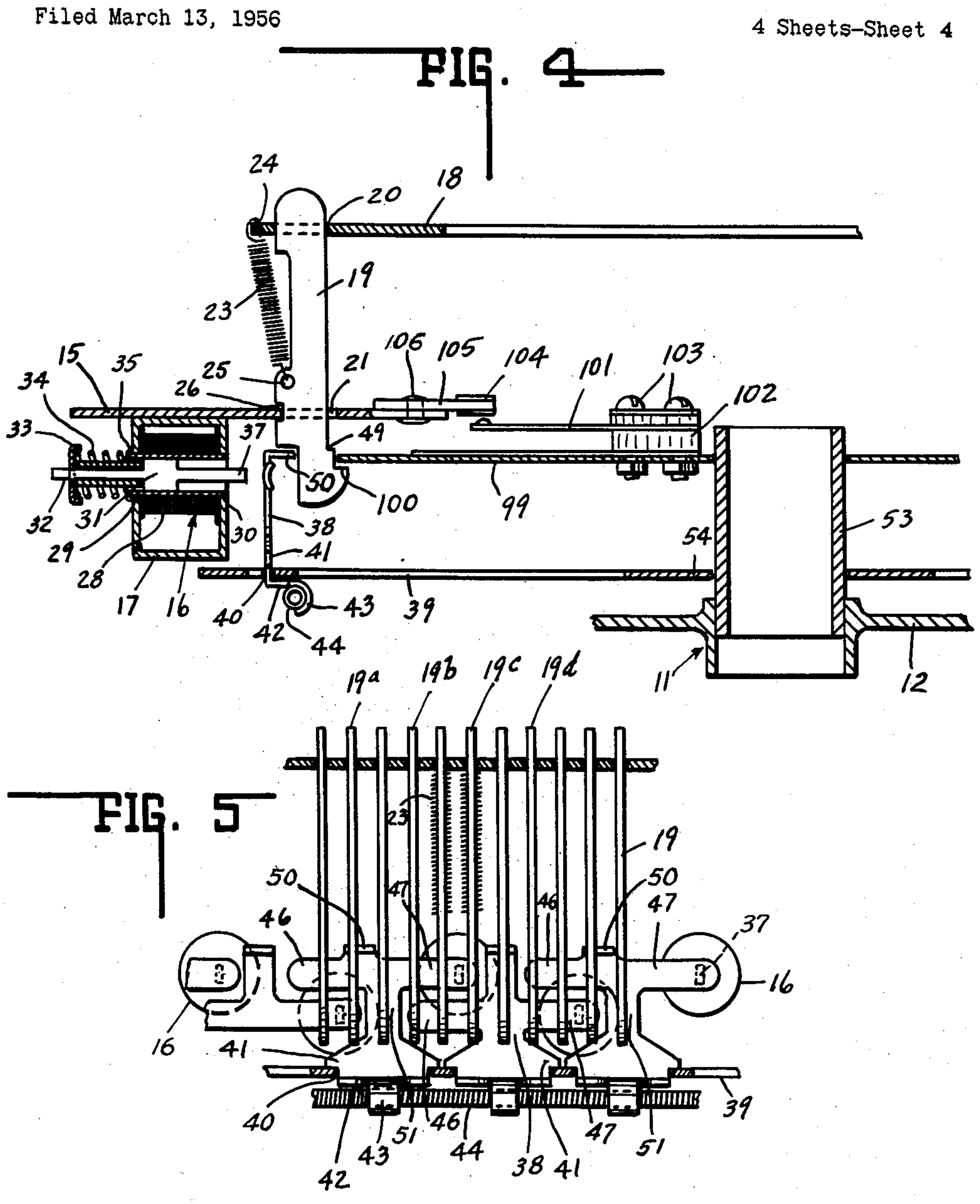
Fig. 4 is a partial cross section taken on line 4—4 of Fig. 1.
Fig. 5 is a partial section taken on the arc 5—5 of Fig. 1.

Each pin is normally maintained in the position shown in Fig. 4 by means of a spring 23, one end of which may be hooked through an aperture 24 slightly within the periphery of plate 18 and the other end of which may be hooked within an aperture 25 formed, as shown, in the lower half portion of each pin 19. Each of the pins 19 is provided with a notch 26 which normally engages the outer edge of the slot 21 in plate 15. Since the upper end of each spring 23 is secured outwardly of the lower end of the spring and outwardly of the outer edge of the slot 21, spring 23 has a tendency to engage notch 26 with the outer edge of slot 21. In this fashion all of the pins 19 normally rest in the position shown in Fig. 4.

Each of the solenoids 16 comprises a coil 28 wound on a spool 29 which may extend through apertures 30 formed in each side of the box frame 17, whereby coil 28 may be supported within each frame 17. An armature 31 may be slidably supported within the spool 29 and may have an outwardly projecting stem 32 which carries a flanged disk 33 adapted to confine a compressed spring 34 bearing on the outer surface of frame 17, as shown at 35. Spring 34 normally holds armature 31 in a retracted position as illustrated in Fig. 4. Armature 31 may also include an inwardly extending stem member 37.

A plurality of pin selecting members 38 are pivotally mounted within elongated slots 40 formed adjacent the periphery of a rotatable wheel 39. Each member 38 comprises a base member 41 normally disposed within the elongated slot 40 and having a turned over end portion 42 terminating in a turned back hook 43. A long coil spring 44 may be arranged to engage the inner portion of the hooks 43 under tension, whereby the portions 42 of each tongue abut the lower surface of the rim of wheel 39 and thereby assume an erect position as shown in Fig. 4.

Each of the pin selecting members 38 includes elongated wing members 46 and 47 which are disposed in the same plane with the associated armature stem 37, whereby the wheel 39 may be rotated through a limited arc and an armature stem 37 may be operated into engagement with its associated wing members 46 and 47 as wheel 39 is rotated through a predetermined arc of operation.

Extending outwardly of the wing members 46 and 47 on each pin selector 38 is a pin operating finger 50 adapted when pushed inwardly by stem 37 to push pin 19 to the right (Fig. 4), thereby disengaging notch 26 from slot 21 causing spring 23 to pull pin 19 upwardly. As pin 19 moves upwardly, the pushing motion of finger 50 continues so that a stop 49 formed on pin 19 engages the lower surface of plate 15 stopping upward movement of pin 19. Alternate pin selector members 38 include an elongated arm 51 while intermediate pin selector members 38 have wing portions 46 and 47 supported directly on the base portions 41, whereby wing members 46, for example, overlap adjacent wing members 47. In this manner, adjacent solenoids 16 can engage their armature stems 37 with their respective wing members 46, 47, even though the wheel 39 is rotated through a certain arc.

The base plate 11 is provided with a tubular shaft portion 53 which serves as a guide for the hub portion 54 of the wheel 39. The wheel is rotatably supported by means of rollers 56 rotatably mounted in any suitable fashion on brackets 57 fixed to the base plate 11. Since the mechanism is intended to be mounted horizontally, wheel 39 will ride and rotate on the rollers 56.

The wheel 39 may be driven by means of a solenoid 60 mounted in any suitable manner to the lower surface of base plate 11. The armature 61 of solenoid 60 may be flexibly connected by means of the coil spring 62 to a lever 63 pivotally mounted to base plate 11 by means of a pivot pin 64. The free end of lever 63 may be limited with respect to counterclockwise movement by means of a stop member 66 mounted in fixed relation to base plate 11 by means of the bracket 67. In order to impart rotative movement to wheel 39, lever 63 is arranged to engage a drive pin 68 mounted in the hub portion 54 of wheel 39.

Figure 3:
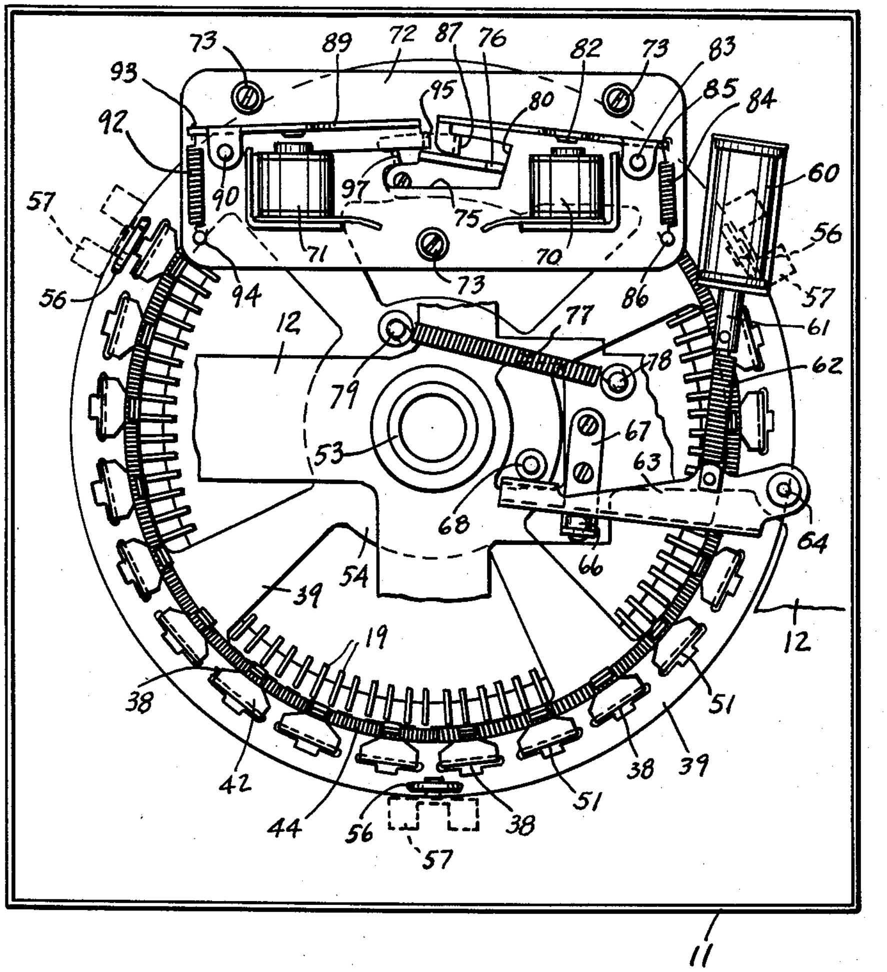
Fig. 3 is a bottom plan view of the mechanism illustrated in Figs. 1 and 2.

Wheel 39 is arranged to move the pin selector members 38 through a series of three steps. To this end, two stop magnets 70 and 71 are secured to a mounting plate 72 which may be fastened to base plate 11 by means of screws 73. An elongated aperture 75 is formed in plate 72 and a dog 76 which may be an integral part of wheel 39 extends from the rim thereof through aperture 75. A biasing spring 77 is attached between a post 78 anchored to base plate 11 and a post 79 secured to the hub portion 54 of wheel 39. Spring 77 serves normally to hold the wheel 39 in the position shown in Fig. 3 with the dog 76 engaging the wall 80 of aperture 75. This establishes a first position of wheel 39, wherein the fingers 50 of each pin selector member 38 are in position to engage a first selector pin 19.

The magnet 70, for example, includes an armature 82 pivotally mounted at 83 on the plate 72 and biased to an inoperative position by means of the coil spring 84 hooked over the pivoted end of armature 82, as at 85, and anchored to a post 86 mounted in plate 72. The free end of armature 82 includes an extension having a stop member 87 normally positioned outwardly of the path of movement of the dog 76 on wheel 39. When electromagnet 70 is operated to attract its armature, stop member 87 is moved into the path of movement of dog 76, thereby establishing a second position of wheel 39.

Stop magnet 71 includes an armature 89 pivotally mounted at one end on a post 90 fixed to the plate 72. A biasing spring 92 may be hooked at one end to the pivoted end of armature 89, as at 93, the other end being anchored to a post 94, fixed to plate 72. Spring 92 normally serves to bias the outer end of armature 89 outwardly of the path of movement of dog 76. Armature 89 includes an extension having a stop member 95 which may be moved into the path of movement of dog 76 when electromagnet 71 is energized, thereby to establish a third position of wheel 39.

The fourth position of wheel 39 is established by a stop member 97 formed at the other end of aperture 75, and in the path of movement of the lug 76 on wheel 39. If neither of the electromagnets 70 or 71 have been energized, wheel 39 will assume the fourth position when its driving solenoid 60 is energized. The spacing of wall 80, stop 87, stop 95, and stop 97 is arranged so that a given pin selecting finger 50 will skip alternate pins 19 as the wheel 39 moves from one stop position to another. Thus, a given finger 50 may engage pins **19*a*, 19*b*, 19*c*, or 19*d***.

Above the wheel 39 there is a disk 99 which is mounted over the upper end of the shaft 53 and extends radially outwardly thereof over the hook portion 100 of each of the pins 19. Three spring contacts 101 may be mounted in angularly spaced relation to one another, as shown in Fig. 1, on the insulating blocks 102 and secured to disk 99 by means of suitable bolts 103. A mating stationary contact 104 may be mounted on insulating block 105 fixed to the upper surface of the annular plate 15 by means of a rivet 106. When the pins 19 move upwardly they operate to elevate disk 99 sufficiently to close at least one of the contacts 101 with its associated contact 104. These switches may be utilized for the purpose of starting the phonograph motor.

Figures 2, 6:
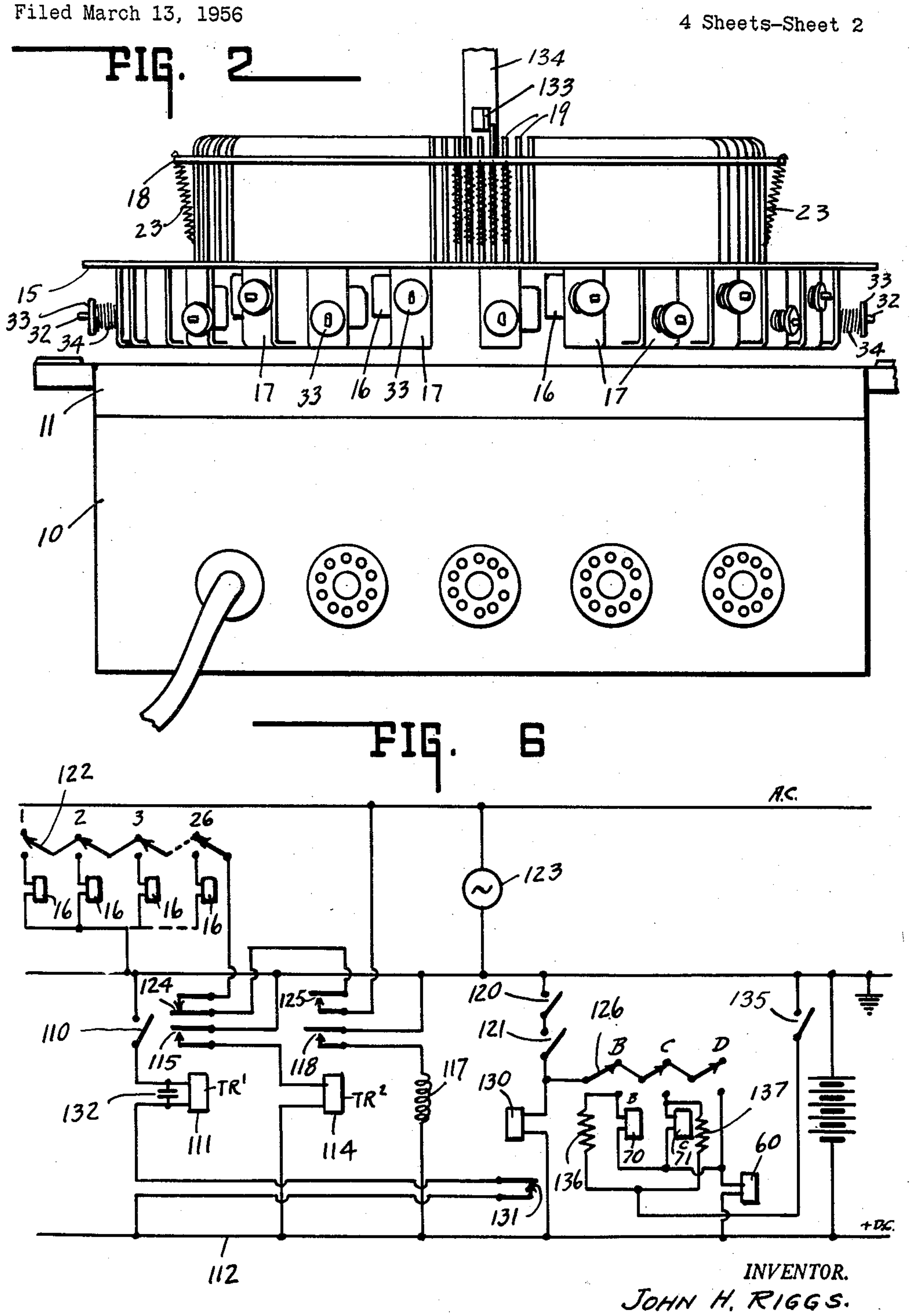
Fig. 2 is a side elevation of the mechanism illustrated in Fig. 1.
Fig. 6 is a circuit diagram illustrating a control circuit for the selector.

Fig. 6 illustrates one type of control circuit which may be utilized for operating the mechanism illustrated in Figs. 1 to 5. A switch 110, operated in response to insertion of a coin in a coin-operated phonograph, may be connected in series with a first relay 111 across a direct current line 112. A second relay 114 may be connected across line 112 in series with a pair of normally open contacts 115 which are controlled by relay 111. A latch solenoid 117 may be connected across the line 112 in series with a pair of normally open contacts 118 which are controlled by relay 114. In turn, the latch solenoid, when energized, may operate to unlock number latch switch 120, and letter latch switch 121. The mechanical relationship of latch solenoid 117 with the letter and number latch switches is not shown since such arrangements are conventional in the art.

A plurality of number switches 122 are connected in series with one another to the alternating current source 123 through normally closed contacts 124 of relay 111 and normally open contacts 125 of relay 114. Switches 122 serve to complete circuits through the selector solenoids 16 so that after a coin is inserted in the automatic phonograph the number switches may be closed to energize those selector solenoids corresponding with a record to be selected.

The letter switches 126 are connected in series with one another through the letter or stop magnets 70 and 71, and also through the driver magnet 60. Switches 126 and the associated magnets are connected across the line 112 by means of the number latch switch 120 and the letter latch switch 121.

It will be noted that a start relay 130 is also connected in series with the switches 120 and 121 so that it becomes energized when the switches are closed. Relay 130 includes a pair of normally closed contacts 131 connected in series with the relay 111.

Contacts 131 de-energize relay 111 to initiate operation of the selector solenoids 16 and the stop magnets 70 and 71 as will be explained.

The number switches 122 and the letter switches 126 illustrated in the circuit of Fig. 6 form a conventional part of a coin-operated wall box or selector panel by which record selections may be made. For example, conventional wall boxes or selector panels may include four buttons labelled A, B, C, and D and a series of number buttons marked with the numerals 1 to 26. A record selection would be identified as A1, B1, C1, D1, etc. In this manner a total of one-hundred and four record selections may be available by using four letter switches and twenty-six number switches.

In operation, the selector apparatus disclosed herein cooperates with an automatic phonograph such as that shown in the application for Letters Patent Serial No. 388,242, aforesaid. As explained in said application, selector pins, such as the pins 19, serve to stop rotation of a scanning arm 133 fixed to a rotating shaft 134 which controls the positioning of the record magazine, as shown in said patent application, thereby to position a selected record or a selected side of a record for playing. It should be noted that the selector apparatus provided herein may be utilized for the purpose of selecting a certain record after which a double stylus pick-up may move into playing contact with either side of said record. The selector apparatus may also be utilized as disclosed in said application as a means of presenting a selected side of a record to a single stylus for playing.

Operation of the selector apparatus may be initiated when the key switch 110 is operated directly or indirectly in response to insertion of a coin or coins in an automatic phonograph. This energizes relay 111, closing normally open contacts 115 to energize relay 114 and open normally closed contacts 124 which prevent energization of the selector solenoids 16. Relay 114 serves to energize a latch solenoid 117 by closing normally open contacts 118. Relay 114 also closes normally open contacts 125 in the selector solenoid circuit.

When the latch solenoid 117 is energized it operates auxiliary apparatus which unlocks the letter and number switches 126 and 122, respectively. These switches are normally mechanically locked against operation, thereby to prevent operation of the switches until after a coin is inserted in the phonograph.

When one of the letter switches 126 is closed and one of the number switches 122 is closed by pushing letter and number buttons, the latch switches 120 and 121 are operated by suitable mechanical linkages into closed position. Closure of switches 120 and 121 initiates the selection cycle by energizing a starting relay 130, which opens contacts 131 in the circuit of relay 111. Relay 111 is provided with a shunt condenser 132 making it a slow-to-release relay, whereby its contacts are not operated for a period of approximately 400 milliseconds. During this interval, the driver relay 60 and one of the letter stop relays 70 or 71 operate provided, of course, that one of the B or C switches 126 has been closed.

In this manner, driver solenoid 60 operates through its linkage 61, 62, 63 to rotate the wheel 39. If stop relay 70 has been energized, wheel 39 rotates only to a first-stop position. If stop relay 71 has been energized, the wheel 39 rotates to the second-stop position. If neither of the switches B or C are operated but the switch D is operated, then wheel 39 rotates through its full arc of operation to a third-stop position. If, on the other hand, an A switch (not shown) is operated the solenoid 60 is not energized and, hence, wheel 39 remains in its normal rest position. It is to be noted that spring 62 connected between armature 61 of solenoid 60 and lever 63 provides for lost motion of armature 61 when either of the stop relays 70 or 71 is energized.

At the end of the 400 millisecond delay period and after driver solenoid 60 has rotated wheel 39, relay 111 will release its contacts 115 and 124. Contacts 124 close and even though contacts 115 open a circuit to relay 114, it is provided with a delay period of approximately 50 milliseconds, whereby contacts 124 and 125 are simultaneously closed. Assuming that one of the number switches 122 has been closed, one of the solenoids 16 will become energized at the time that contacts 124 close.

The modification of the invention disclosed herein includes twenty-six solenoids 16. Accordingly, each number switch 122 energizes a certain one of the twenty-six solenoids 16. As shown in Fig. 5, there are four selector pins 19 which may be actuated by each solenoid 16, thereby providing a total of one-hundred and four pins 19 which may be selected by the solenoids 16. The four-stop positions of the wheel 39 determine which of the four pins associated with each solenoid 16 will be operated. In this manner, operation of an A switch button and a number 1 switch button will cause the solenoid representing the numeral 1 to push its associated finger 50 into contact with the selector pin 19*a*, for example. If the B button is pushed, the same solenoid representing the numeral 1 would push its associated finger 50 into contact with the selector pin 19*b*.

When the finger 50 engages a selector pin 19, notch 26 disengages from plate 15, whereby spring 23 moves the pin in its uppermost position with the stop surface 49 in contact with the lower surface of plate 15. When the pin 19 moves upwardly it carries therewith the disk 99 or that portion of the disk adjacent to the operated pin. Disk 99 is tilted upwardly sufficiently to close contacts 101 and 104 which serve to close the circuit of the phonograph drive motor (not shown). This will initiate rotation of the shaft 134 and the selector arm 133, which rotation will continue until arm 133 is stopped by that selector pin 19 which has risen into an elevated position. Since the shaft 134 controls rotation of a record magazine, a selected record or side of a record will have been presented for playing by a phonograph pick-up.

As previously mentioned, relay 114 releases after a period of approximately 50 milliseconds, whereby contacts 118 and 125 open to de-energize solenoids 16 and latch solenoid 117. The latch switches 120 and 121 are opened and the letter and number switches 126 and 122 are restored to open position. In this manner, the control circuit restores itself to normal.

The control circuit of Fig. 6 is provided with facilities permitting operation by a remote control selector box, such as a wall box. Upon insertion of a coin in a remote wall box, the circuit is closed, as at 135, allowing a small amount of current to flow through the resistors 136 and 137 and through the stop magnets 70 and 71, together with the driver solenoid 60. Operation of button switches in the remote wall box causes a positive direct current pulse to be applied to the stop magnets and the driver solenoid or directly to the driver solenoid, thereby causing the wheel 39 to move to the selective position. After the pulse has terminated, the wheel remains in the selected position, due to the relatively small current flowing through the resistors 136 and 137 to the driver solenoid 60. After an interval, an alternating current pulse is applied to a selected pin-selecting solenoid 16 through the alternating current circuit, thereby releasing a selected pin 19. When the pulse terminates, the remote wall box opens switch 135, thereby restoring the circuit to normal.

While the invention has been disclosed as utilizing number designated switches for operating solenoids 16 and letter designated switches for operating driver solenoid 60 and stop magnets 70 and 71, it will be obvious to those skilled in the art that letter designations may be used for solenoids 16 and number designations may be used for driver solenoid 60 and stop magnets 70 and 71.

The invention claimed is:

1. A selector apparatus adapted to cooperate with an automatic phonograph having a mechanism for selecting and presenting a record for playing and manually operable number and letter switches, comprising an annular array of spaced selector pins normally latched in an idle position and unlatchable to move into position to cooperate with said mechanism to control its operation for presenting a selected record for playing, a series of stationary solenoids disposed concentrically and outwardly of said pins and arranged to respond to said number switches, a wheel rotatably mounted coaxially of said solenoids, pin selector members mounted on said wheel between said solenoids and said pins and corresponding in number with the number of solenoids for unlatching said pins, each selector member including an elongated arm disposed transversely of its cooperating solenoid and having a pin-engaging portion, means for rotating said wheel through an arc corresponding approximately in length with the length of said arm, spaced stops disposed for movement into the path of movement of a portion of said wheel for positioning said selector members with their pin-engaging portions in operative relation to different selector pins, and electromagnetic means for moving one of said stops into said path of movement in response to actuation of one of said letter switches, whereby each selector member may be moved into operative relation with any one of a group of selector pins.

2. A selector apparatus adapted to cooperate with an automatic phonograph having a mechanism for selecting and presenting a record for playing and manually operable number and letter selector switches, comprising an array of spaced selector pins normally latched in an idle position and movable into position to cooperate with said mechanism to control its operation for presenting a selected record for playing, a series of stationary solenoids disposed adjacent said pins and arranged to respond to said number switches, pin selector members positioned between said solenoids and said pins and corresponding in number with the number of solenoids for actuating said selector pins, each selector member including an elongated arm disposed transversely of its cooperating solenoid and having a pin-engaging portion, means for moving said selector members through a path corresponding approximately in length with the length of said arm, spaced stops disposed for movement into the path of movement of said selector member moving means for positioning said selector members with their pin-engaging portions in operative relation to different selector pins, and electromagnetic means for moving one of said stops into said path of movement in response to actuation of one of said letter switches, whereby each selector member may be moved into operative relation with any one of a group of selector pins.

3. A selector apparatus adapted to cooperate with an automatic phonograph having a mechanism for selecting and presenting a record for playing and manually operable number and letter selector switches, comprising an array of spaced selector pins normally disposed in an idle position and movable to cooperate with said mechanism to control its operation for presenting a selected record for playing, a series of stationary solenoids disposed adjacent said pins and arranged to respond to said number switches, the number of solenoids being equal to a submultiple of the number of selector pins, pin selector members movably positioned between said solenoids and said pins and corresponding in number with the number of solenoids, each selector member including an elongated arm operatively associated with its cooperating solenoid throughout a predetermined path of movement of said member and having a pin-engaging portion, means for moving each selector member through a path corresponding approximately in length with the length of said arm, and electromagnetic means operatively associated with said selector member moving means and operating in response to actuation of letter switches for stopping each selector member with its pin-engaging portion in operative relation with any one of a group of selector pins.

4. A selector apparatus adapted to cooperate with an automatic phonograph having a mechanism for selecting and presenting a record for playing and manually operable number and letter selector switches, comprising an array of spaced selector pins normally disposed in an idle position and movable into position to cooperate with said mechanism to control its operation for presenting a selected record for playing, a series of stationary solenoids disposed adjacent said pins and arranged to respond to said number switches, a pin selector member positioned between each solenoid and said pins and in constant operative relation to its corresponding solenoid for actuating said selector pins, means for moving each selector member into operative relation with several selector pins, and electromagnetic means operatively associated with said selector member moving means in response to actuation of letter switches for positioning said selector members into operative relation with any one of the several selector pins.

5. A selector apparatus adapted to cooperate with an automatic phonograph having a mechanism for selecting and presenting a record for playing and manually operable number and letter selector switches, comprising an array of spaced selector pins normally disposed in an idle position and movable into position to coöperate with said mechanism to control its operation for presenting a selected record for playing, a series of stationary solenoids disposed adjacent said pins and arranged to respond to said number switches, the number of solenoids being equal to a submultiple of the number of selector pins, pin selector members movably positioned between said solenoids and said pins and in constant cooperative relation with the solenoids for actuating said selector pins and corresponding in number with the number of solenoids, and electromagnetic means operatively associated with said selector members and operating in response to actuation of letter switches for moving each selector member into operative relation with any one pin of a group of selector pins.

6. A selector apparatus adapted to cooperate with an automatic phonograph having a mechanism for selecting and presenting a record for playing and manually operable number and letter selector switches, comprising an array of spaced selector pins normally disposed in an idle position and movable into position to cooperate with said mechanism to control its operation for presenting a selected record for playing, a series of stationary solenoids disposed adjacent said pins and arranged to respond to said number switches, the number of solenoids being equal to a submultiple of the number of selector pins, a pin selector member in constant operative association with each solenoid and a group of said pins and movable into position for actuating one of said selector pins, and electromagnetic means operatively associated with said selector members and operating in response to actuation of letter switches for moving said member into position to actuate one selector pin in a group.

7. A selector apparatus adapted to cooperate with an automatic phonograph having a mechanism for selecting and presenting a record for playing and manually operable number and letter selector switches, comprising an array of spaced selector pins normally disposed in an idle position and movable into position to cooperate with said mechanism to control the presenting of a selected record for playing, a series of stationary solenoids operatively associated with groups of said pins and arranged to respond to said number switches, a pin selector member in constant operative relation with each solenoid and movably positioned between each solenoid and its group of said pins for actuating a single selector pin, and electromagnetic means operatively associated with said selector member and operating in response to actuation of letter switches for moving said selector member into position for operating a selected one of said selector pins.

8. A selector apparatus adapted to cooperate with an automatic phongraph having a mechanism for selecting and presenting a record for playing and manually operable number and letter selector switches, comprising an array of spaced selector pins normally disposed in an idle position and movable into position to coöperate with said mechanism to control the presenting of a selected record for playing, a stationary electromotive device operatively associated with a group of said pins and arranged to respond to one of said number switches, a pin selector member in constant operative association movably positioned between said electromotive device and its group of said pins for actuating a single selector pin, and electromotive means operatively associated with said selector member and operating in response to actuation of letter switches for moving said selector member into position for operating a selected one of said selector pins.

9. A selector apparatus adapted to coöperate with an automatic phonograph having a mechanism for selecting and presenting a record for playing and manually operable number and letter selector switches, comprising an array of spaced selector elements normally disposed in an idle position and movable into position to cooperate with said mechanism to at least partially effect selecting of a record for playing, stationary electromotive devices each operatively associated with a group of said elements and each arranged to respond to a number switch to predetermine the group of said elements including the one to be selected for movement, and electromotive means operatively associated with said devices and operating in response to actuation of letter switches for selectively moving of one element within the predetermined group of selector elements.

References Cited in the file of this patent

UNITED STATES PATENTS

| | | |
|---|---|---|
| 2,416,436 | Eakins | Feb. 25, 1947 |
| 2,572,609 | Gierwiatowski | Oct. 23, 1951 |
| 2,621,241 | Jensen | Dec. 9, 1952 |
| 2,624,795 | Bodoh | Jan. 6, 1953 |

FOREIGN PATENTS

| | | |
|---|---|---|
| 731,730 | France | Sept. 6, 1932 |